(12) United States Patent  (10) Patent No.: US 7,706,688 B2
Boudreault et al.  (45) Date of Patent: Apr. 27, 2010

(54) WAVELENGTH RECONFIGURABLE OPTICAL NETWORK

(75) Inventors: Francois Boudreault, Ottawa (CA); Hanan Anis, Kanata (CA); S. Richard Pramod, Ottawa (CA)

(73) Assignee: University of Ottawa, Ottawa (CA)

( * ) Notice: Subject to any disclaimer, the term of this patent is extended or adjusted under 35 U.S.C. 154(b) by 499 days.

(21) Appl. No.: 11/778,135

(22) Filed: Jul. 16, 2007

(65) Prior Publication Data

US 2008/0013950 A1    Jan. 17, 2008

Related U.S. Application Data

(60) Provisional application No. 60/807,507, filed on Jul. 17, 2006.

(51) Int. Cl.
*H04J 14/00* (2006.01)
*H04J 14/02* (2006.01)

(52) U.S. Cl. .............................. 398/59; 398/70; 398/72; 398/83

(58) Field of Classification Search .................. 398/58, 398/59, 66–68, 70–72, 83
See application file for complete search history.

(56) References Cited

U.S. PATENT DOCUMENTS 6,614,568 B1 *  9/2003  Feuer ........................... 398/75
7,106,974 B2     9/2006  Lee et al. .................... 398/168
7,272,321 B1 *   9/2007  Kuo et al. ...................... 398/99
2002/0067523 A1 * 6/2002  Way ............................ 359/119
2002/0171890 A1 * 11/2002 Lin et al. .................... 359/124
2006/0153563 A1 * 7/2006  Feuer et al. .................... 398/45

OTHER PUBLICATIONS

W. Lee, M. Y. Park, S. H. Cho, J. H. Lee, C. Y. Kim, G. Jeong, and B. Y. Kim, "Bidirectional WDM-PON based on gain-saturated reflective semiconductor optical amplifiers," IEEE Photon. Technol. Lett. 17, 2460-2462 (2005).
P. Healey, P. Townsend, C. Ford, L. Johnston, P. Townley, I. Lealman, L. Rivers, S. Perrin, and R. Moore, "Spectral slicing WDM-PON using wavelength-seeded reflective SOAs," IEE Electron. Lett. 37, 1181-1182 (2001).
M. Zirngibl "Multifrequency lasers and applications in WDM networks," IEEE Comm. Mag., 36(12), 39-41 (1998).

* cited by examiner

*Primary Examiner*—Dalzid Singh
(74) *Attorney, Agent, or Firm*—Teitelbaum & MacLean; Neil Teitelbaum; Doug MacLean

(57) ABSTRACT

The invention provides a unified optical network architecture for metro and access communication networks, wherein a metro ring network interfaces access PONs through one or more reconfigurable Optical Add/Drop Multiplexers to provide wavelength-reconfigurable all-optical transmission of communication signals from the metro ring network to designated optical network units associated with the end-users, and wherein one metro hub located in the metro ring network is utilized to set transmission wavelengths and timing for both downstream and upstream signal transmission for multiple access PONs.

21 Claims, 10 Drawing Sheets

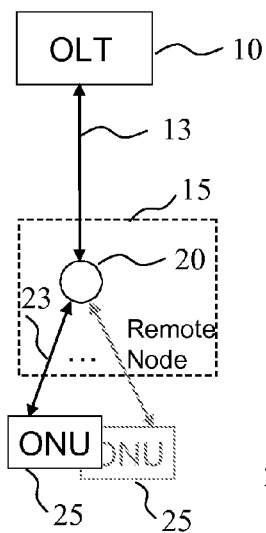 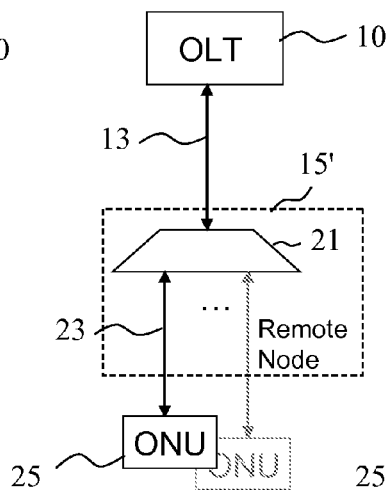 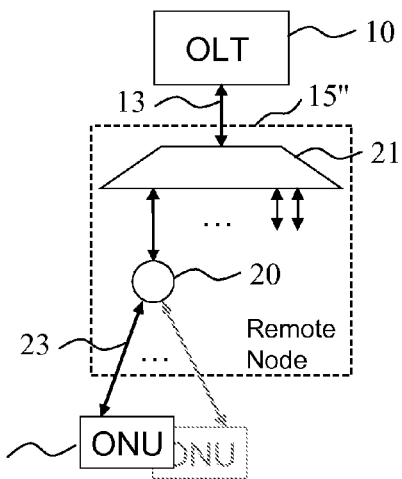
FIG. 2 (PRIOR ART)  FIG. 3 (PRIOR ART)  FIG. 4 (PRIOR ART)

WAVELENGTH RECONFIGURABLE OPTICAL NETWORK

CROSS-REFERENCE TO RELATED APPLICATIONS

The present invention claims priority from U.S. Provisional Patent Application No. 60/807,507 filed Jul. 17, 2006, entitled "Optical Access Network Architecture", which is incorporated herein by reference.

TECHNICAL FIELD

The present invention relates generally to optical networks, and in particular to wavelength reconfigurable optical networks utilizing reconfigurable optical add-drop multiplexers as interfaces between a metro ring network and access passive optical networks for providing wavelength-based services to end users.

BACKGROUND OF THE INVENTION

A typical metro-area network aggregates access traffic over a ring roughly 40-50 km in circumference, with typically 4-5 nodes interspersed along it. Each node serves as a portal for a local community through an access network, with residential and business users being added over time. Broadband access networks based on so called fiber to the home (FTTH), fiber to the curb (FTTC), or fiber to the building (FTTB) approaches are becoming the preferred technology for green field deployments. Passive optical networks (PONs) are increasingly employed for delivering broad-band wavelength based services from the metro-area network to the end users using optical fibers.

With reference to FIG. 1, a typical passive optical network consists of an optical line terminal (OLT) 10 performing optical-electrical-optical (OEO) conversion, a remote node (RN) 15 and a number of Optical Network Units (ONUs) 25 near end users. The OLT 10 can be located at a service provider's central office, where traffic coming from a metro edge node 5 in the form of a dedicated optical channel is received, undergoes the OEO conversions and is re-transmitted to the users. Typically, up to 32 ONUs can be connected to an OLT. The term "passive" indicates that optical transmission lines between the OLT 10 and the ONUs 25 have no power requirements or active electronic parts.

FIG. 2 illustrates one prior-art PON implementation, which is also known as the TDM-PON (Time Division Multiplexed Passive Optical Network). In this implementation, each ONU receives the same optical signal, which is generated by the OLT and broadcast to the ONUs 25 using a passive optical splitter 20 at the remote node 15. Each ONU may be assigned a time slot by the OLT 10 for receiving information designated for this ONU; data encryption can be used to prevent eavesdropping. Upstream optical signals are generated by the ONUs using a time division multiple access (TDMA) protocol, wherein the OLT provides time slot assignments for the upstream communication, and are combined at the remote node 15 in a single upstream optical channel, wherein signals from individual ONUs are time-multiplexed, which is then passively transmitted to the OLT 10. The upstream optical signals are typically at a different wavelength from the downstream signals. The OLT 10 typically communicates with the metro ring network 2 through an add/drop port of an optical add-drop multiplexer (OADM) located at the metro edge node 5 using a different set of wavelengths that is used for the OLT-ONU communications.

The TDM-PON architecture combines the high capacity offered by optical fiber with the low cost of a passive infrastructure. The sharing of bandwidth in TDM-PON is limited to a single wavelength.

FIG. 3 illustrates another prior art PON implementation known as WDM-PON (Wavelength Division Multiplexed Passive Optical Networks), wherein the passive optical power splitter 20 in the remote node 15 is replaced with a wavelength de-multiplexer (DMUX) 21 to spectrally separate the wavelengths coming from the OLT 10 on the same fiber 13. In this implementation, the OLT has several transmitters and generates a dedicated optical signal at a different wavelength for each ONU 25, which provides an additional communication bandwidth.

FIG. 4 shows a hybrid PON architecture called TDM/WDM PON that is attractive because it provides more bandwidth than TDM PON by using several wavelengths, and allows more flexibility in sharing bandwidth amongst neighboring ONUs than WDM PON through TDM. The hybrid TDM/WDM PON architecture features many transmitters at the OLT 10 and a remote node with a DMUX 21 followed by a passive optical power splitter 20 for each or some of the wavelength.

One drawback of the aforedescribed prior-art PON architectures is that they require OEO conversion at each OLT, wherein an OLT receives an optical signal coming from the metro ring network 2, and re-transmits as downstream traffic using one or several dedicated fixed optical transmitters; disadvantageously, the OLT represents a significant part of the cost of current PON architectures.

Another drawback of the prior art access network architectures in that the metro edge node 5, which serves as an interface between the metro ring network and the PON, typically utilizes a fixed optical add-drop multiplexer (OADM), so that wavelengths that are added and dropped at each metro edge node are fixed. This disadvantageously limits the flexibility of wavelength assignment in the metro ring network and possibilities for wavelength reconfiguration and re-use.

An object of the present invention is to provide a unified metro-access optical network architecture that would be free of at least some of these and other drawbacks of the prior art optical networks, and enable wavelength re-configurability and re-use at the metro-PON interface and in the metro-area network at a lower cost.

SUMMARY OF THE INVENTION

In accordance with one aspect of the invention, there is provided a wavelength reconfigurable unified metro-access optical network for providing communication services to end-users, which comprises a metro ring network (MRN) interconnecting a plurality of network nodes, and a first passive optical network (PON) optically connected to the MRN at one of the network nodes. The first PON comprises a plurality of optical network units (ONU) associated with the end-users, and a remote node for directing one or more wavelength channels received from the MRN to the ONUs through a plurality of optical access links. The MRN comprises a metro hub for aggregating communication signals onto a plurality of wavelength channels and for transmitting said wavelength channels over the MRN, and a first optical add-drop module (OADM) disposed at the one of the network nodes and interfacing the first PON for selectively dropping at least one of the wavelength channels for providing thereof to one or more of the plurality of ONUs, wherein the first OADM is remotely configurable to selectively direct any of the plurality of the wavelength channels to the first PON so as to provide wavelength re-configurability in the optical network.

In accordance with another aspect of this invention, each of the ONUs of the optical network comprise an ONU receiver for receiving the at least one of the wavelength channels and an ONU transmitter for transmitting an upstream optical signal to the metro hub, wherein the ONU transmitter is remotely configurable for transmitting the upstream optical signal at any one of a plurality of spaced wavelengths.

In accordance with another aspect of this invention the metro hub comprises a multi-wavelength optical source for generating the external optical signal for remotely setting the wavelength of the ONU transmitter.

According to one aspect of the invention, communication signals targeting end-users are aggregated onto multiplexed wavelength channels in a metro hub (MH) for all-optical transmission of the wavelength channels to designated ONUs associated with the end-users without OEO conversion. The MH is located in the MRN so that it resources can be shared by the plurality of PONs. The MRN includes one or more reconfigurable optical add-drop modules (ROADM) which serve as interfaces between the MRN and the PONs. The ROADMs are remotely controlled to re-direct any one or more selected wavelength channels propagated in the MRN towards a specified PON, and can change the dropped channel selection. The ONUs include optical receivers with optional tunable optical filters at their inputs, and colorless transmitters which can be set to transmit at any one of a plurality of wavelengths by an optical signal from the metro hub, which may also coordinate the ONU transmission in time for bandwidth sharing via time domain multiplexing (TDM).

BRIEF DESCRIPTION OF THE DRAWINGS

The invention will be described in greater detail with reference to the accompanying drawings which represent preferred embodiments thereof, wherein:

FIGS. 2 to 4 are schematic diagrams of prior art PON-based access networks;

DETAILED DESCRIPTION

Term Definition

AWG Array Waveguide Grating
PON passive optical network
WDM wavelength division multiplexing
TDM time division multiplexing
ONU optical networking unit
OLT optical line terminal
MRN metro ring network
MH metro hub
OADM optical add/drop multiplexer
ROADM reconfigurable optical add/drop multiplexer
OEO optical-electrical-optical The terms "downstream transmission" and "upstream transmission" are used to mean transmission of signals to and from end-user ONUs, respectively.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

The present invention provides a unified optical network architecture for metro and access communication networks, wherein a metro ring network (MRN) interfaces access PONs through one or more reconfigurable Optical Add/Drop Multiplexers (ROADMs) to provide reconfigurable all-optical transmission of communication signals from the MRN to designated optical network units (ONUs) associated with the end-users, and wherein one metro hub located in the MRN is utilized to set transmission wavelengths and timing for both downstream and upstream signal transmission for multiple PONs.

Figure 1:
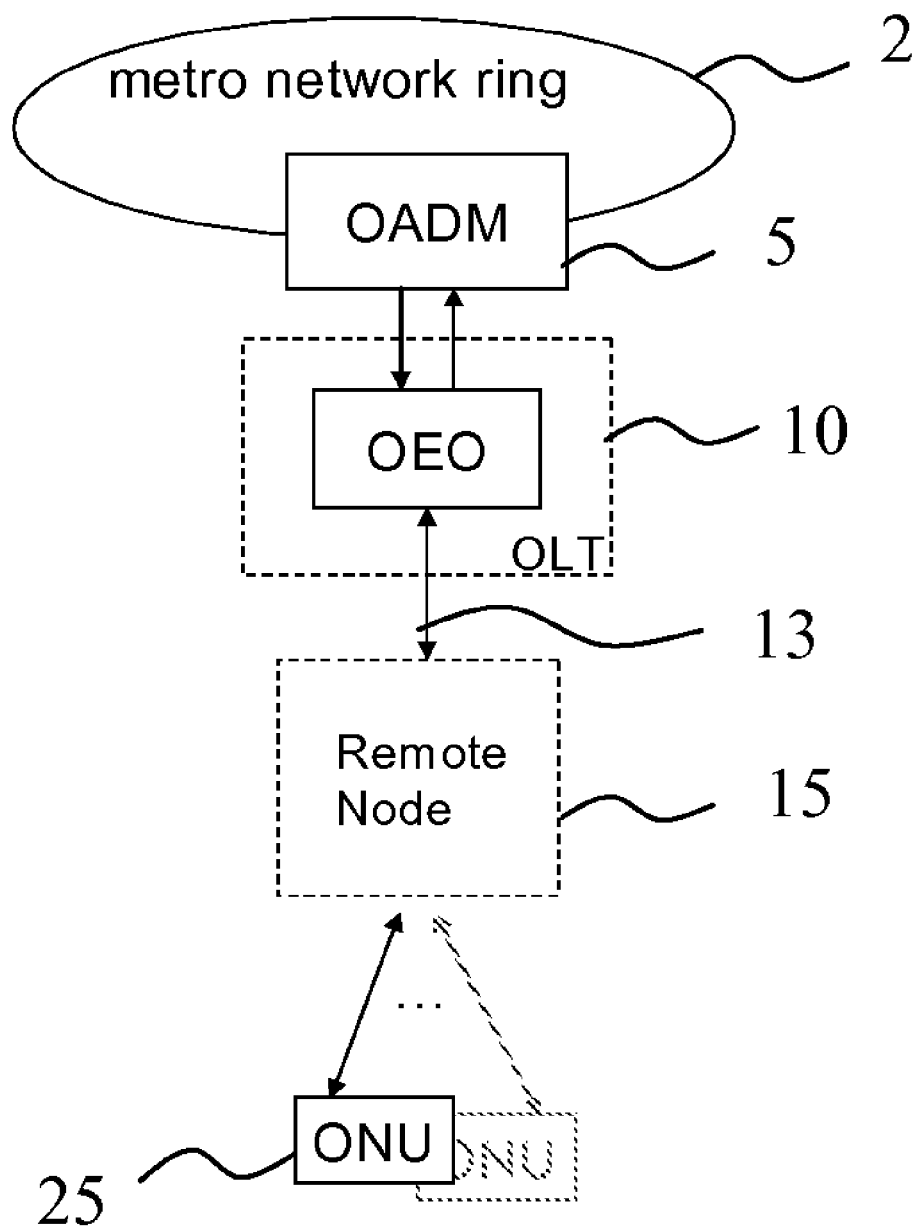
FIG. 1 is a schematic diagram of a prior art metro area network.
Figure 5:
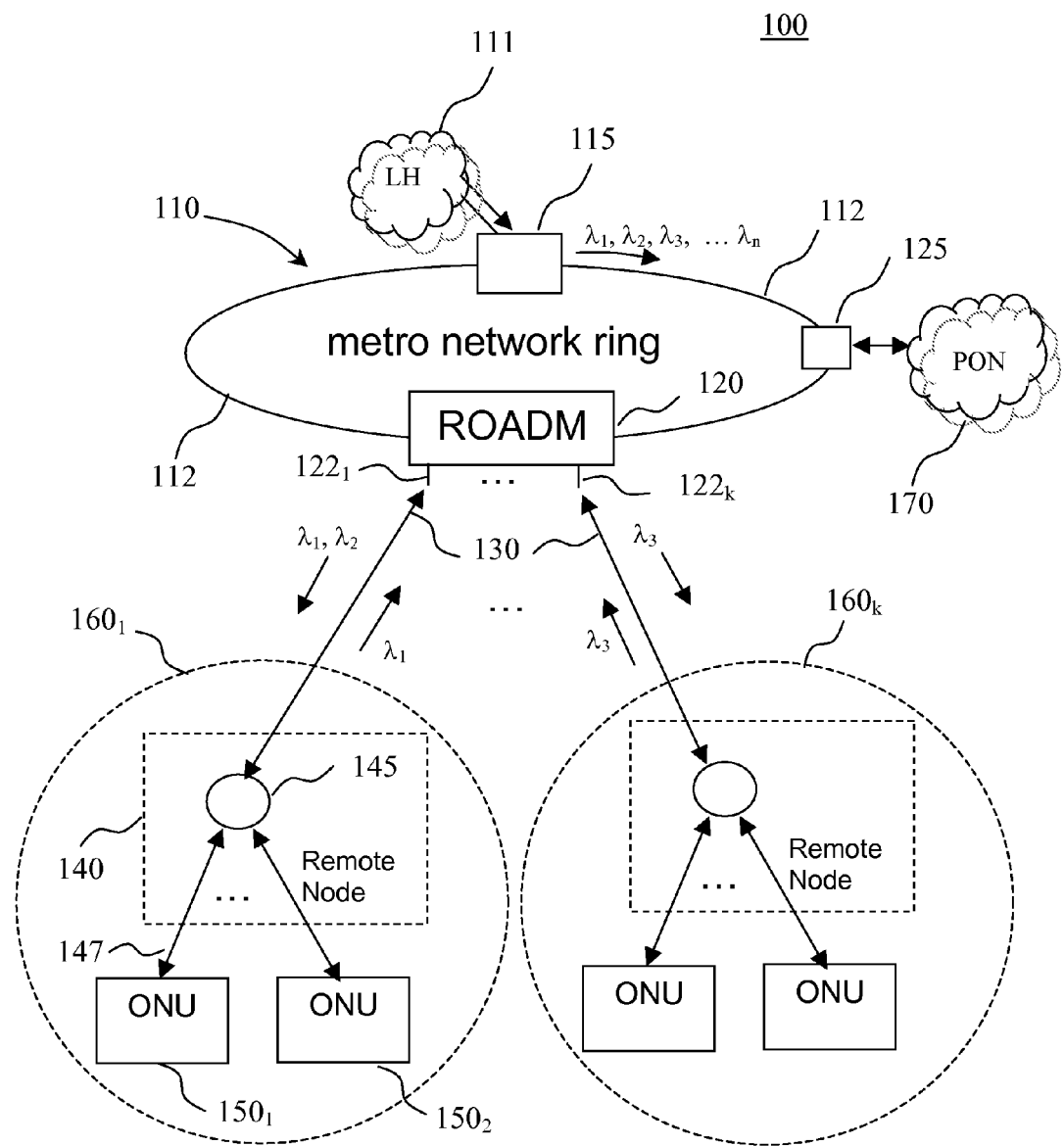
FIG. 5 is a schematic diagram of a wavelength reconfigurable metro-access optical network utilizing a multi-port ROADM to interface a plurality of PONs.

FIG. 5 shows a generalized diagram of an optical network 100 in according to one embodiment of the present invention. An MRN 110 includes a plurality of network nodes such as nodes 115, 121 and 120, interconnected by fiber-optic cables 112 to form a ring, which can be about 20-50 km in circumference. The network node 120 includes a reconfigurable OADM, which is referred to hereinafter as the ROADM 120. The ROADM 120 serves as an interface between the MRN 110 and a plurality of PONs, of which two—PON $160_1$ and PON $160_2$—are shown for the purpose of illustration, and which generally will be referred to herein as PONs 160. Referring to the PON $160_1$ by way of example, it includes a remote node (RN) 140 that is connected to a plurality, for example 16, of end-user ONUs, which are represented in FIG. 5 by ONUs $150_1$ and $150_2$ and are generally referred to herein as ONUs 150.

The MRN 110 includes a metro hub (MH) 115, wherein communication signals that are to be provided to the end-users are aggregated onto one or more of optical carriers, which are spaced in wavelength, preferably according to a 50 GHz, 100 GHz, or 200 GHz wavelength grid specified by the International Telecommunication Union-Telecommunication Sector (ITU grid). The MH 115 can receive at least some of the communications signals destined to the end-user ONUs connected to the MRN 115 from a long-haul network 111, which is schematically shown in FIG. 5 as a cloud. The aggregated signals are optically transmitted over the MRN 110 as wavelength-multiplexed optical channels at a plurality of WDM wavelengths $\lambda_i$, i=1, . . . , n, for example as defined by the 100 GHz ITU grid. The wavelength multiplexed channels are hereinafter also referred to as the WDM channels or the wavelength channels; an i-th wavelength channel can also be referred to according to it central wavelength, e.g. as a wavelength channel $\lambda_i$, or simply as a wavelength $\lambda_i$ when this cannot lead to a confusion.

Those wavelength channels that are not dropped at node 125 are provided to the ROADM 120, which selectively drops wavelength channels carrying signals designated for ONUs 150 of the PONs 160. In the shown embodiment, the ROADM 120 has a plurality of (drop) ports $122_1$ through $122_k$, of which only two are shown and which are generally referred to herein as (drop) ports 122. Each of the (drop) ports 122 connects to a remote node 140 of a PON 160 by means of a trunk optical link 135. The number of drop ports of the ROADM 120 depends on the network requirements and particular ROADM technology, and would typically vary between 1 and 16.

Preferably, the ROADM 120 can be remotely configured to drop any single wavelength channel from the plurality of wavelength channels $\lambda_i$, i=1, . . . , n supported by the MRN 110 at any of the ports 122. In one embodiment, the same wavelength can be dropped at two or more of the ports 122 for broadcasting to two or more PONs. In other embodiments each particular wavelength channel can be dropped only at a single drop port 122, and is thereby removed from the MRN 110 so as to enable to re-use the dropped wavelength, for example for upstream transmission of return signals from the respective PONs as described hereinbelow.

Figure 6:
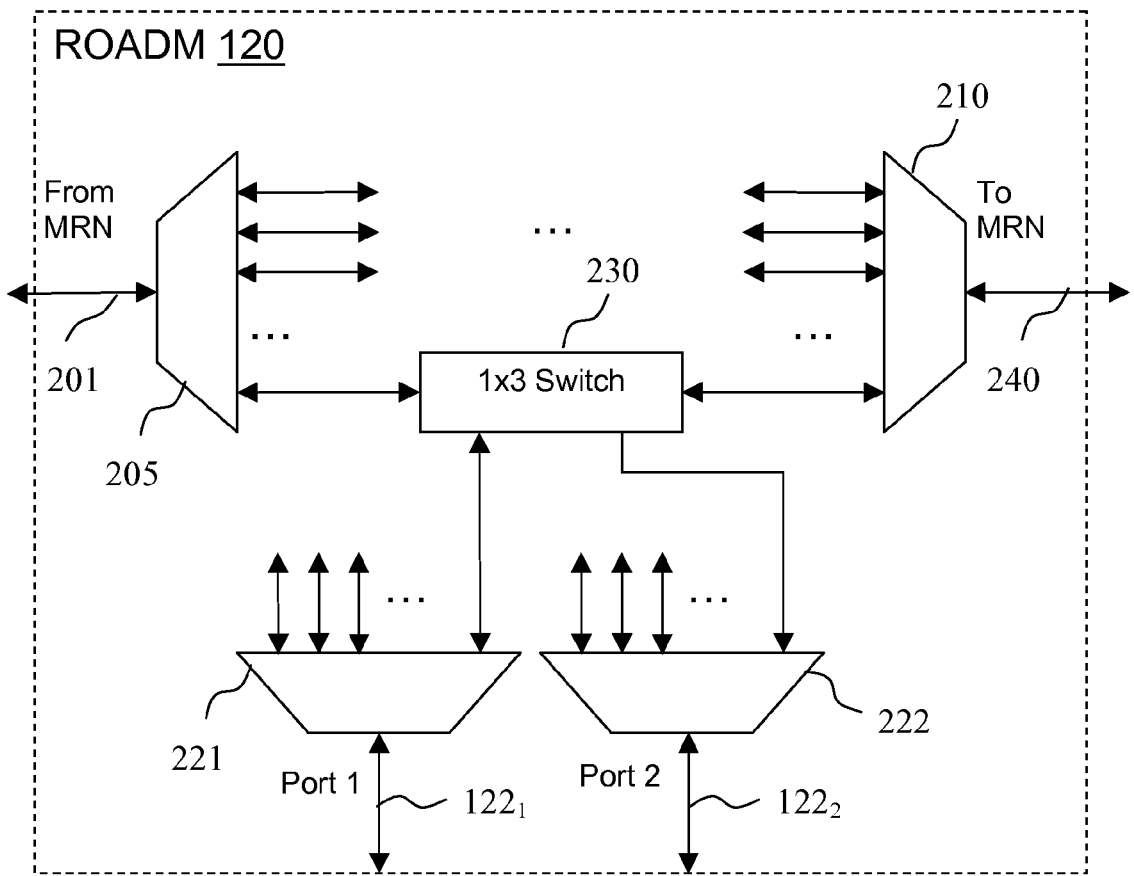
FIG. 6 is a schematic diagram of a ROADM having two add/drop ports.

One possible embodiment of the ROADM 120 is shown in FIG. 6. By way of example this ROADM has two drop ports $122_1$ and $122_2$, but may have a larger number of ports or just one drop port. The ROADM is bidirectional, so that the drop ports $122_1$ and $122_2$ function also as the ROADM add ports, and therefore will also be referred to hereinafter as the add/drop ports. Upstream optical signals originating from different ONUs enter the ROADM through a respective drop port 122. The ROADM has four bidirectional optical ports in total, with ports 201 and 240 connecting to the MRN 115, and the add/drop ports 122 connecting to the PONs 160, and includes four WDM filters 205, 210, 221 and 222, one per each port, which are optically connected through an array of 1×3 bidirectional switches 230, of which only one is shown so not to overcrowd the figure. The WDM filters 205, 210, 221 and 222 are preferably embodied as array waveguide gratings (AWG), but can also be formed using alternative technologies as known to those skilled in the art, for example based on wavelength selective switching (WSS) and/or wavelength blockers. The ROADM causes the upstream optical signals received at one of the ports 122 to take the exact same path to the metro hub, but in the opposite direction, as downstream optical signals of the same wavelength that are dropped through the same port 122.

In the context of this specification, the term "unidirectional" used in relation to an optical element such as optical waveguide, optical fiber, component, port or device, means that said optical element supports optical signal propagation in only a single direction, while the term "bidirectional" means that said optical element supports optical signal propagation in two directions. In the drawings accompanying this description bidirectional and unidirectional optical links are schematically shown by bidirectional and unidirectional arrows, respectively. One skilled in the art would appreciate however that a bidirectional link in one embodiment can be substituted with two unidirectional links in another embodiment, and vice versa.

Considering by way of example the operation of the ROADM of FIG. 5 in one direction of optical signal propagation, a plurality of downstream wavelength channels may be received from the MRN 110 by the AWG 205, which then spatially separates these channels according to their wavelength, and passes each of them through a corresponding 1×3 switch 230 to a respective de-multiplexed waveguide port of one of three multiplexing AWGs 210, $220_1$ or $220_2$, each of which combines spatially separated optical signals into a single optical output, so that a particular wavelength can either continue its propagation in the MRN 110, or be dropped through one of the drop ports $122_1$ and $122_2$, depending on a setting of the respective 1×3 switch at a particular time. Preferably, the 1×3 switches 230 are remotely controlled by a controller from a central office, for example from the metro hub 115, and can be remotely set to any of the 3 switch states to provide full remote reconfigurablility of the ROADM. Generally, by using M drop AWGs in place of AWGs 220 and 1×M switches in place of the 1×3 switches 230, the ROADM of FIG. 6 can have M drop ports, with M ranging from 1 to 32 or larger. In this embodiment, the ROADM 120 can drop any designated combination of the wavelength channels $\lambda_i$ supported by the MRN 110 at any one of the drop ports 122, with the dropped downstream channels being removed from the MRN 110, and being optionally replaced by upstream channels at the same wavelength that can be added at the respective drop port 122 from the PONs 160 as described hereinbelow. Advantageously, the ROADM design illustrated in FIG. 6 enables efficient wavelength re-use, and can be implemented in a single chip using planar waveguide technology, in which case each arrow in FIG. 6 represents a planar waveguide, and can be relatively inexpensive in mass-production.

Alternative embodiments of the ROADM 120 are possible, for example those based on optical power splitters and wavelength blockers. Some embodiments of the ROADM 120 may have separate add and drop ports to support unidirectional transmission in the MRN 115, in which case each particular pair of the add and drop ports can be connected to the bidirectional trunk optical link 135 through an optical circulator.

Turning back to FIG. 5, an exemplary scenario is illustrated wherein the ROADM 120 drops wavelength channels $\lambda_1$ and $\lambda_2$ at port $122_1$, and a single wavelength channel $\lambda_3$ at port $122_2$. The remote node $160_1$, which may be located 10 to 20 kilometers away from the MRN 110 and the ROADM 120, so as to be relatively close to the end user ONUs 150, includes a power splitter 145, which has a trunk port that is connected to the drop port $122_1$ of the ROADM 120 by the trunk fiber link 135, and a plurality of access ports connected to the ONUs 150 by access optical links 145. The power splitter 145 splits the received channels $\lambda_1$ and $\lambda_2$ in approximately equal power portions, one for each ONU 150 of the PON $160_1$, and broadcasts both channels to each of the ONUs 150 using the access fiber-optic links 145. Similarly, the remote node $140_2$ of the PON $160_2$ broadcasts channel $\lambda_3$ to each of the ONUs of the respective PON.

Advantageously, the ROADM 120 establishes an optical path from the metro hub 115 to each of the ONUs 150, without an intermediate OEO conversion conventionally performed at an OLT for each PON in prior art access networks. This optical path is fully wavelength reconfigurable, so that the wavelength channels that are dropped at any particular drop port of the ROADM 120 and delivered to the ONUs of a respective PON can be changed as needed. To take full advantage of this reconfigurability, in a preferred embodiment of the invention the MH 115 and the ONUs 150 are colorless for the upstream and downstream channels. The terms "upstream channels" and "downstream channels" refer herein to wavelength channels that are transmitted by the ONUs 150 and are received by the ONUs 150, respectively. The term "colorless" is used herein to mean that a particular optical system or device, to which the term relates, has a functionality that is substantially independent on the wavelength of a received or transmitted channel.

Figure 7:
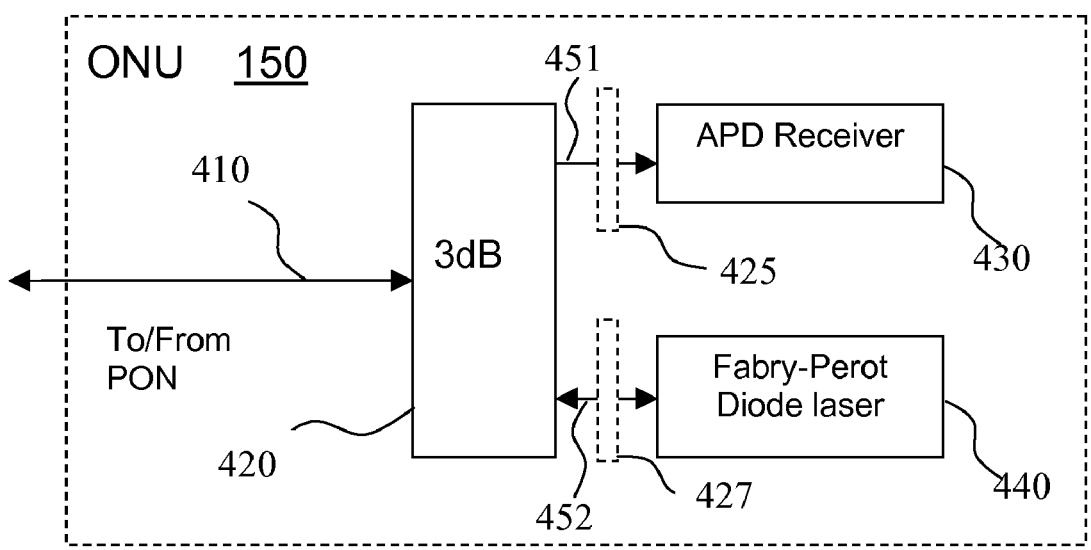
FIG. 7 is a schematic diagram of an optical networking unit according to one embodiment of the present invention.

FIG. 7 illustrates main elements of the ONU 150 in one embodiment of the invention. As shown, the ONU 150 includes an input 1×2 optical coupler 420, embodied for example as a 3 dB directional fused-fiber coupler and having a bidirectional input port 410 and two output ports optically coupled to an optical receiver 430, through an optional tunable optical filter 425, and to a colorless optical transmitter 440 through another tunable optical filter 427. The bidirectional input port 410 connects the ONU 150 to the RN 140 via the access fiber-optic link 147.

The optical receiver 430 will be referred to hereinafter also as the ONU receiver, and can be embodied for example using a commercially available avalanche photo diode (APD), a pin photodiode, or the like. The colorless transmitter 440 will be referred to hereinafter also as the ONU transmitter; as shown it is embodied as a Fabry-Perot (FP) laser diode, and is configured for injection locking by an optical signal received from the coupler 420, as described for example in U.S. Pat. No. 7,106,974, which is incorporated herein by reference. A conventional multi-mode edge-emitting FP laser diode operating in a desired wavelength range, e.g. in the 1.55 μm region, and having a desired modulation bandwidth, which is commercially available from many suppliers of optical transmitters, can be used as the ONU transmitter 440. Such an off-the-shelf FP laser diode can include an input optical isolator, in which case said optical isolator should be removed therefrom before using the FP laser diode in the ONU transmitter 440. In another embodiment, the ONU transmitter 440 can be based on vertical-cavity semiconductor lasers (VCSELs). In yet another embodiment, the ONU transmitter 440 can be based on a reflective optical amplifier such as a reflective semiconductor optical amplifier (RSOA) having a reflective coating on one end thereof and wavelength-seeded by the external optical signal from the metro hub, and incorporating an optical modulator; such devices are described for example in articles by W. Lee, M. Y. Park, S. H. Cho, J. H. Lee, C. Y. Kim, G. Jeong, and B. Y. Kim, entitled "Bidirectional WDM-PON based on gain-saturated reflective semiconductor optical amplifiers," IEEE Photon. Technol. Lett. 17, 2460-2462 (2005), and by P. Healey, P. Townsend, C. Ford, L. Johnston, P. Townley, I. Lealman, L. Rivers, S. Perrin, and R. Moore, "Spectral slicing WDM-PON using wavelength-seeded reflective SOAs," IEE Electron. Lett. 37, 1181-1182 (2001), which are incorporated herein by reference. One skilled in the art would appreciate that additional optical elements such as bulk and SELFOC™ lenses can be used to increase coupling efficiency for optical signals to and from the ONU transmitter 440; such coupling arrangements are common in the art and are not shown in FIG. 7.

Figure 8:
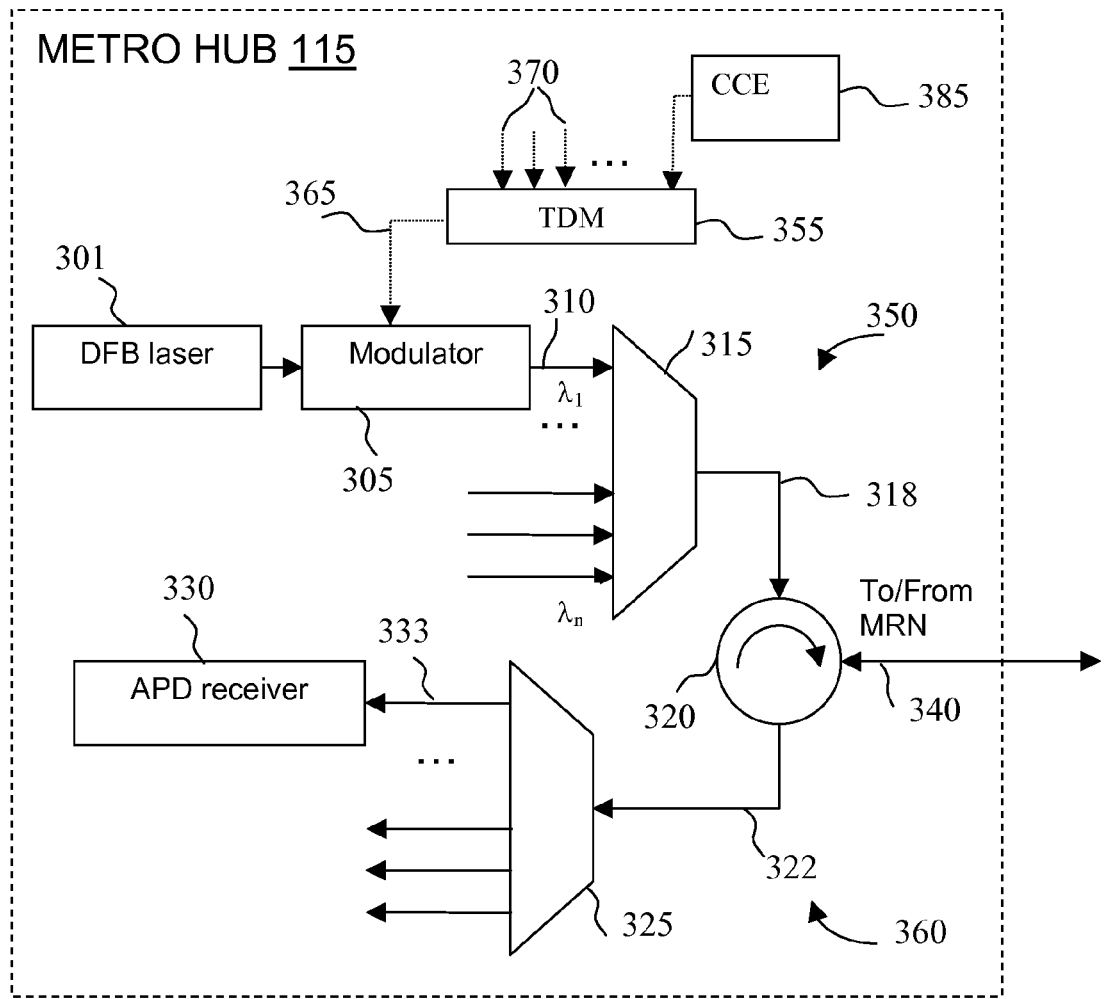
FIG. 8 is a schematic diagram of a metro hub for operating with the ONU shown in FIG. 7 according to the present invention.

Turning now to FIG. 8, a metro hub 115 configured for operting with the ONU 150 of FIG. 7 includes a transmit path 350 and a receiver path 360, which are coupled to a bi-directional input/output port 340 through a circulator 320 for connecting to the MRN 115. The transmit path 350 includes a plurality of DFB lasers 301 for generating optical carries at the WDM wavelength set $\lambda_i$, i=1, . . . , n, for example on a 100 GHz ITU grid, each DFB laser 301 connected to an input port of an n×1 optical multiplexer 315 through an optical modulator 305, with each DFB laser—optical modulator pair forming an optical transmitter for transmitting a modulated wavelength channel. An output port of the multiplexer 315 is optically connected to a first input port of the 3-port optical circulator 320. The receive path 360 includes an optical demultiplexer 325 having an input port connected to a third port of the circulator 320, and n output ports 333 each connected to an APD receiver 330. In other embodiments, alternative single-wavelength optical sources such as DBR lasers or VCSELs can be used in place of the DFB lasers 301. The multiplexer 315 and demultiplexer 325 are preferably embodied as n-channel AWGs, but can also be embodied using other multiplexing technologies such as thin film filters. The optical modulators 305 can be embodied for example as semiconductor electroabsorption modulators (EAM), or any other optical modulators known in the art and capable of providing the required functionality and modulation bandwidth. The optical transmitters 308 can also be embodied as directly-modulated wavelength-stabilized semiconductor lasers, provided that an associated wavelength chirp is small enough that it can be tolerated for the transmission distances in the system. The metro hub 115 also includes electrical TDM circuitry 335 for aggregating communication signals 370 into a TDM electrical signal 365 for modulating the metro hub transmitters, and communications control equipment (CCE) 385, which generates control signals for remotely configuring the ROADM 120 and tunable filters of the ONUs 150, and for synchronizing ONU transmitters for TDM operation. Electrical signals and corresponding electrical connections in FIG. 5 are represented by dotted lines and arrows, while optical signals by solid lines and arrows.

The operation of the optical network of FIGS. 5-8 will now be described by way of example, considering first a scenario when communication services that are to be provided to the ONUs 150 of the PON 160$_1$ require a total downstream bandwidth of two wavelength channels, and an upstream bandwidth of a single wavelength channel. Responsive to the bandwidth requirements, the communication control equipment 385 designates wavelengths $\lambda_1$ and $\lambda_2$ to carry downstream communication traffic for the PON 160$_1$, and the wavelength $\lambda_1$ to carry upstream communication signals from each of the ONUs 150 of the PON 160$_1$. Simultaneously, the wavelength $\lambda_3$ can be designated to carry both downstream and upstream communication traffic for ONUs of the PON 160$_k$.

The downstream communication signals 370, which are to be provided to a first group of the ONUs of the PON 160$_1$ represented in FIG. 7 by the ONU 150$_1$, are multiplexed in the time domain by the TDM circuitry 350, with each ONU allocated a time slot in a resulting time domain multiplexed (TDM) signal, and the TDM signal is used by the optical modulator 305 to modulate the optical carrier at the wavelength $\lambda_1$ generated by a DFB laser 301. Similarly, downstream communication signals designated for a second group of the ONUs of the PON 160$_1$ represented in FIG. 7 by the ONU 150$_2$, are multiplexed in the time domain by another electrical time domain multiplexer not shown in FIG. 8, and a resulting second TDM signal is used to modulate an optical carrier at the wavelength $\lambda_2$ generated by another of the plurality of DFB lasers 301. The resulting wavelength channels $\lambda_1$ and $\lambda_2$, together with the wavelength channels $\lambda_3$ carrying downstream signals designated to the ONUs of the PON $160_k$, are optically multiplexed by the AWG 315, and launched into the MRN 115 via the bidirectional port 340 of the optical circulator 320.

The communication control equipment 385 remotely sets the ROADM 120 to drop the wavelengths $\lambda_1$ and $\lambda_2$ through the drop port $122_1$, and sets the tunable filters 427 at the ONU $150_1$ and $150_2$ to transmit the wavelength channel $\lambda_1$ while blocking the wavelength channel $\lambda_2$, and remotely sets the tunable filter 425 at the ONU $150_2$ to transmit the wavelength channel $\lambda_2$ while blocking the wavelength channel $\lambda_1$; this can be done using suitable control equipment at the ROADM 120 and the ONUs 150 and a designated communication channel or a TDM signal overhead as known in the art. Similarly, the ROADM 120 can be remotely configured to drop the wavelength $\lambda_3$ through the drop port $122_2$, while simultaneously suitably configuring tunable filters of the ONUs of the PON $160_2$ to transmit this wavelength to the respective ONU receiver and transmitter.

After the network configuration described hereinabove is performed responsive to control signals from the metro hub 115, the ROADM 120 drops the wavelengths $\lambda_1$ and $\lambda_2$ from the MRN 110 and re-directs them to the RN 140 of the PON $160_1$, which broadcasts these channels to each of the ONUs $150_1$ and $150_2$. At the ONU $150_1$ both these modulated wavelengths are received through the bidirectional optical port 410 by the coupler 420, which splits them according to a pre-defined power splitting ratio in two optical signals 451 and 452, each containing the wavelength channels $\lambda_1$ and $\lambda_2$. The tunable optical filter 425 blocks the wavelength $\lambda_2$, and lets the wavelength $\lambda_1$ through to be received and demodulated by the ONU receiver 430, which may also include circuitry for extracting a designated communication signal at allocated time slots by performing a reverse TDM.

The wavelength channel $\lambda_1$ is passed with some attenuation by the coupler 420 through the tunable filter 427 so as to enter the FP cavity of the FP laser 440, thereby setting the transmission wavelength of the FP laser 440 to be equal to the wavelength $\lambda_1$ of the received optical signal, an effect known in the art as injection locking or injection seeding. Accordingly, the FP laser 440 generates an upstream optical signal at the wavelength $\lambda_1$ of the received downstream channel, and at time slots designated to the ONU $150_1$ for upstream transmission by the communication control equipment at the metro hub 115.

The ONU $150_2$ operates similarly to the ONU $150_1$, with the following differences: the tunable filter 425 of the ONU $150_2$ is set to block the wavelength $\lambda_1$ and to transmit the wavelength $\lambda_2$, so that the receiver 430 of the ONU $150_2$ extracts its downstream communication signal from the wavelength channel $\lambda_2$ at designated time slots, while the FP laser transmitter of the ONU $150_2$ is injection locked to transmit a the wavelength $\lambda_1$ at time slots allocated by the metro hub 115 to the ONU $150_2$ for upstream transmission.

The upstream optical signals at the wavelength $\lambda_1$ generated by the respective FP laser diodes 440 of the ONUs $150_1$ and $150_2$ are coupled by the couplers 420 back into the ONU input/output ports 410, and are transmitted by the bidirectional access links 147 to the RN 140, where they are combined by the power splitter 145 into a single upstream wavelength channel $\lambda_1$ carrying time-domain multiplexed upstream communication signals from all of the ONUs 150 of the PON $160_1$. The upstream wavelength channel $\lambda_1$ is then passed through the bidirectional trunk optical link 130 back to the add/drop port $122_1$ of the ROADM 120, which adds it to the MRN 110, where it is transmitted to the metro hub 115. At the metro hub 115 the TDM-multiplexed upstream wavelength channel $\lambda_1$ is directed by the circulator 320 to the receive path 360 where it is separated by the AWG 325 from other upstream wavelength channels and is received by the receiver 330, which converts the TDM-multiplexed upstream channel $\lambda_1$ into an electrical signal for de-multiplexing and further processing as required.

The need to change the PON wavelength allocation can come from many sources, including changing bandwidth demands by the end-users, network upgrades, or service providers offering new services. For example, one or more ONUs may temporarily require more bandwidth because of deployed on-demand services, such as HDTV, running at a particular moment in time. Depending on a nature of a particular bandwidth-hungry service, the bandwidth requirement it imposes on the network might have a different pattern from day to day or according to different time of the day, requiring thus an efficient and dynamic means of performing bandwidth allocation, which is provided by the present invention. Advantageously, the aforedescribed network of the present invention seamlessly integrates the metro-area and access networks, i.e. the MRN 110 and the PONs 160, in one unified metro-access optical network that provides fully wavelength-reconfigurable optical paths from a metro hub to end-user ONUs without intermediate OEO conversions.

Figure 9:
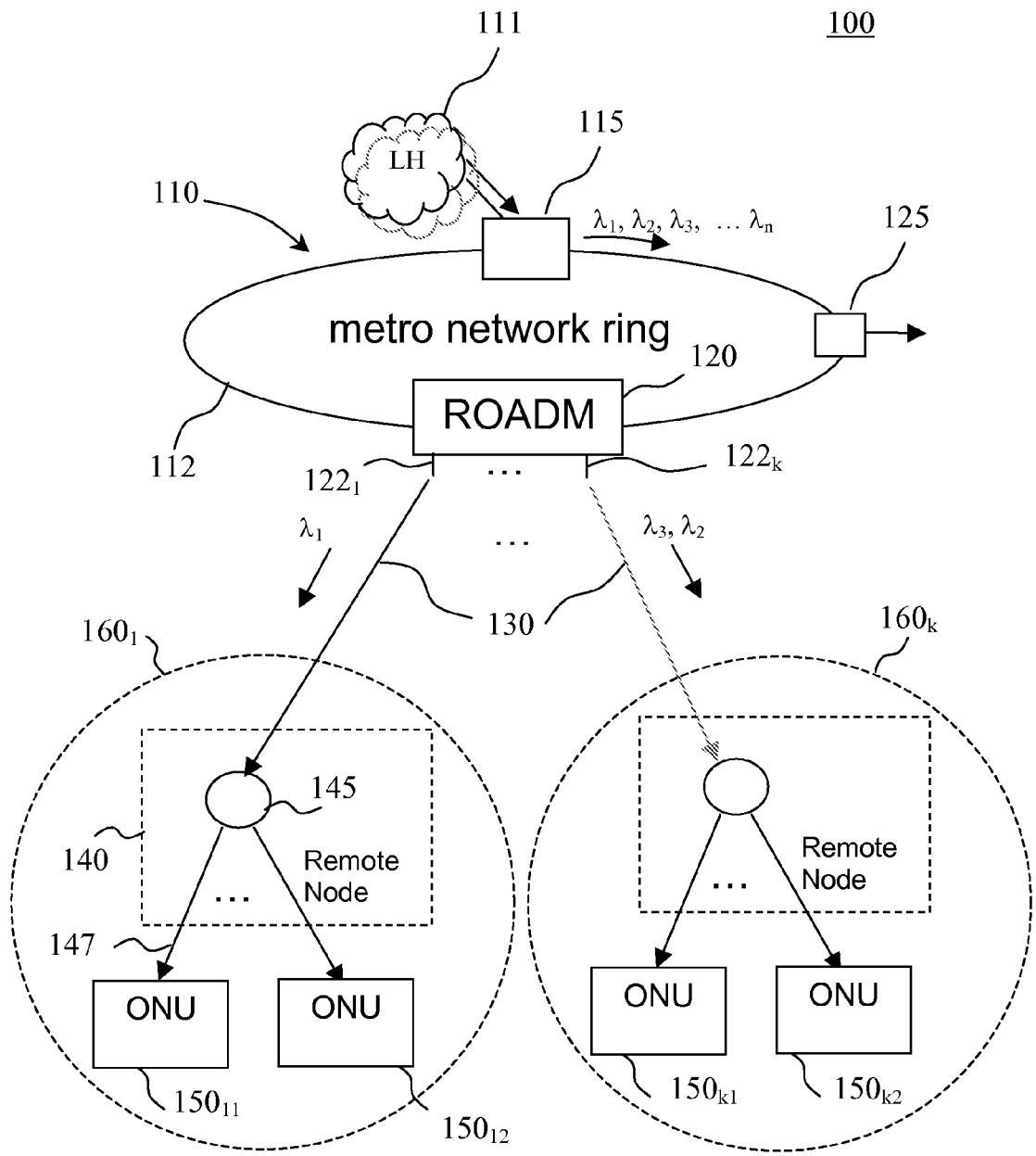
FIG. 9 is a schematic diagram of the wavelength reconfigurable metro-access optical network shown in FIG. 5 after wavelength reconfiguration.

Turning back to FIG. 5, an exemplary scenario will now be described when total bandwidth demands by ONUs 150 of the PON $160_1$ are reduced from a bandwidth of two wavelength channels to a bandwidth that can be provided by a single wavelength channel, while bandwidth demands of the PON $160_2$ are increased and now require two wavelength channels. Such a scenario can occur, for example, if PON $160_1$ serves primarily business users having peak bandwidth demands during the work day, while PON $160_2$ serves primarily residential areas with an after-hours peak bandwidth usage. To adapt to changed conditions, the network control equipment 385 at the metro hub 115 can remotely reconfigure the network shown in FIG. 5, so as to re-direct the wavelength channel $\lambda_2$ from the PON $160_1$ to PON $160_2$, as illustrated in FIG. 9, and utilize it to carry downstream traffic to a selected group of the ONUs of the PON $160_2$ while keeping the wavelength channel $\lambda_3$ for the downstream traffic to the rest of the ONUs of the PON $160_2$. This can be accomplished by performing the following steps responsive to control signals from the metro hub 115: a) reconfiguring the ROADM 120 to drop the wavelength $\lambda_2$ at the drop port $122_k$ instead of $122_1$, b) at the PON $160_1$, tuning the Rx optical filters 425 of the second group of the ONUs, which is represented by the ONU $150_2$ in FIG. 5, to block the wavelength $\lambda_2$ instead of $\lambda_1$ and to transmit the wavelength $\lambda_1$ to the ONU receiver 430, c) at the PON $160_2$, tuning the optical filters 425 of the selected group of the ONUs to block the wavelength $\lambda_1$ and to transmit the wavelength $\lambda_2$ to the ONU receiver 430, and d) re-allocate time slots for the upstream and downstream transmission for the ONUs of PONs 160 in accordance with the new wavelength channels assignments.

The colorless ONU transmitters 440 having an output transmission wavelength that is defined by an external optical signal, and which and can be thereby remotely set to emit at any of a plurality of wavelength by an external optical signal provided from the metro hub 115, is an important element of the invention. As stated hereinbefore, commercially available directly-modulated FP laser diodes can be used in such ONU transmitters, provided that they do not have an optical isolator at their input, and their packaging is suitable for the desired modulation speed for the upstream communications, that by way of example can be between about 10 MHz and 2.5 GHz. The optical power of the received downstream channel that is required for locking the FP laser transmitter 440 will depend on several factors such as the optical coupling arrangements, the front facet reflectivity of the used FP laser diode, the output power of the FP laser diode, etc. We found that a typical FP laser diode operating at an output power of about 3 dBm, or about 2 mW, can be wavelength-locked by an external optical signal as small as −25 to −30 dBm.

Numerical Example

By way of example, the optical network of FIG. 5 has the following parameters: the length of optical fiber link between the metro hub 115 and the ROADM 120 is 10 km, the length of the trunk optical link 135 is 10 km, output power of the metro-hub transmitters is 5 dBm, output power of the ONU transmitters 3 dBm; insertion loss of optical devices in the wavelength path between the ONU transmitter/receiver and the metro hub transmitter/receiver: AWG 315—3 dB, circulator—1 dB, optical fiber loss—0.25 dB/km, ROADM—5 dB, optical splitter at the remote node 140—12 dB corresponding to 1×16 splitter, ONU optical coupler—3 dB, tunable filter—1 dB. This corresponds to a typical value of the overall optical loss associated with a wavelength path between the metro hub 115 and an ONU 150 of about 30 dB, so that the ONU transmitter and the ONU receiver each receive a downstream optical signal of about −25 dBm, while optical power of the upstream wavelength channel received by a metro hub receiver is about −28 dBm.

The aforedescribed network architecture of the present invention enables the network to be dynamically reconfigured to allocate bandwidth to the PONs with wavelength channel granularity, so that the total overall bandwidth of the MRN is selectively allocated where it is needed, and when it is needed. The invention thereby provides advantageous network flexibility and a high degree of centralized network control from a single metro hub without the use of costly OEO conversion at each PON interface. This differs advantageously from prior art access networks, which use fixed-wavelength OADMs and OLTs to interface PONs. Fixed OADMs do not provide the possibility to allocate dynamically bandwidth between the different PONs of the network, while utilizing OLTs performing OEO conversions at PON interfaces is more expensive than the novel all-optical network architecture provided by the current invention.

Advantageously, the invention utilizes ONU transmitters which can be set remotely from the metro hub to transmit at any of a plurality of wavelengths by an optical wavelength-locking signal, thereby making the ONUs colorless so that they can be configured to operate, both upstream and downstream, at a plurality of wavelengths supported by the MRN 110 without using expensive optical components such as tunable lasers at each of the ONUs. In a further advantage, the invention provides a single metro hub providing network control services that are shared by a plurality of PONs, thereby eliminating the need to have separate OLTs for each PON to perform these services on a per-PON basis. As described hereinabove, these network control services include a) allocation of TDM time slots for both upstream and downstream transmission for each ONU of a plurality of PONs, b) generating all downstream optical signals for the plurality of PONs, c) generating optical signals to remotely set the wavelength of the colorless ONU transmitters for upstream signal transmission. The sharing of the metro hub between several PONs for performing these functions enables to reduce both the cost of building and operating the network as it simplifies the network control, and the total number of optical network components.

The network described hereinabove with reference to FIGS. 5-9 represents one exemplary embodiment of the unified wavelength-reconfigurable optical network of the present invention. One skilled in the art will appreciate however that numerous changes and modifications can be made in the network described hereinabove in particular implementations of the invention, some of which are now will be described to further illustrate different aspects of the invention.

For example, in an alternative embodiment of the invention the ROADM 120 drops only a single wavelength at each add/drop port 122, so that each of the PONs 160 may receive only a single downstream wavelength channel. In this embodiment, the tunable filters 425, 427 at the ONUs are not required and can be removed, thereby simplifying the ONU design and reducing the network cost. In this embodiment, the total bandwidth available to each of the PONs is limited to a single channel bandwidth. This can however be sufficient for many practical networks, for example if the bandwidth of one downstream wavelength channel is in the 2.5 Gb/s or 10 Gb/s range, which provides per-ONU downstream bandwidth of about 155 Mb/s to about 625 Mb/s for a sixteen-ONU PON. The wavelength reconfiguration capability provided by this embodiment of the invention amounts to a flexibility to change the wavelength allocation between PONs, which is advantageous for network planning and upgrade purposes, and also when the MRN 115 combines wavelength channels of different bandwidth, for example combining cheaper 2.5 Gb/s wavelength channels with 10 Gb/s channels requiring more expensive optical transmitters.

The embodiments described hereinbefore use the modulated downstream optical channels to lock ONU transmitters, causing them to transmit at the wavelength of the received downstream channel. In other embodiments it may be preferable to use separate non-modulated optical transmitters at the metro hub 115 to lock the ONU transmitters; this would eliminate any possibility of cross-modulation between the upstream and downstream signals in the ONU transmitters as a potential source of transmission error, and de-couple the wavelengths of the upstream and downstream transmission of communication signals, which can be useful for network planning purposes. This embodiment is illustrated in FIG. 10, which by way of example shows a unified metro-access optical network 500 having a metro hub 515 and utilizing a ROADM 520 in one of the nodes of an MRN 510 to interface a PON 560.

Similarly to the optical network described hereinabove with reference to FIGS. 5-8, the optical network 500 uses colorless ONUs 550 of which one is shown for illustration. Each ONU 550 includes an ONU transmitter 540 embodied as a directly-modulated FP diode laser that is injection-locked by an external optical signal received from the metro hub 515 to generate at a remotely selected wavelength that can be altered by altering the wavelength of the external optical signal. Accordingly, the ONU transmitter 540 is capable of generating at any one of a plurality of spaced wavelengths as defined by the external optical signal and by the FP laser spectral gain function. However, in this embodiment the external optical signal that defines the ONU transmission wavelength is not the information-carrying modulated downstream wavelength channel received by the ONU receiver 531, but a non-modulated optical signal having a narrow optical spectrum centered at the desired ONU transmission wavelength, which preferably lies on the same ITU wavelength grid as the wavelengths $\lambda_i$ of the downstream wavelength channels. This external optical signal is generated at the metro hub 515 by a dedicated optical source that is distinct from the metro hub transmitters transmitting the downstream information-carrying wavelength channels.

The dedicated optical source disposed at the MH 515 for locking ONU transmitters can have different embodiments. According to the embodiment shown in FIG. 10, the metro hub 515 features two sets of optical transmitters in the form of DFB laser sources 501, each said DFB laser source 501 operating at a unique wavelengths, for example selected from the 100 GHz-spaced ITU grid. The first set includes up to N DFB sources 501 which are modulated and generate the downstream wavelength channels at consecutive ITU wavelengths $\lambda_i$ i=1, ..., N, which all lie within a first wavelength band. These downstream wavelength channels carry communication signals designated to the end-user ONUs; they can be either directly modulated, or may use external or integrated, e.g. electro-absorption based, optical modulators which are not shown in this figure.

Figure 10:
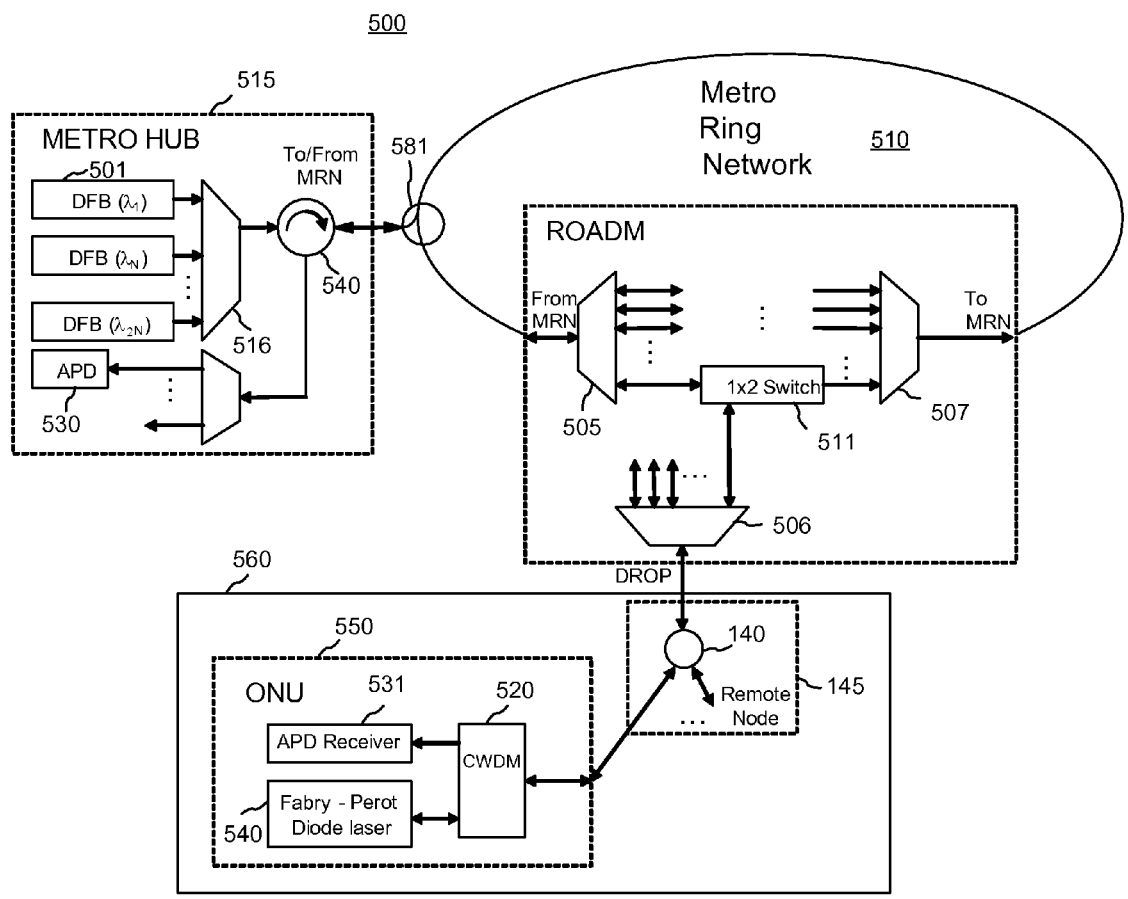
FIG. 10 is a schematic diagram of the wavelength-reconfigurable optical network utilizing a plurality of non-modulated lasers at the metro hub for locking ONU transmitters.

The second set of transmitters 501 also includes up to N DFB laser sources 501, of which only one generating at wavelength $\lambda_N$ and labeled "DFB ($\lambda_N$)" is shown in FIG. 10. The transmitters of the second set generate non-modulated optical signals at ITU wavelength from $\lambda_{N+1}$ to $\lambda_{2N}$ which lie in a second wavelength band adjacent to the first wavelength band, and these non-modulated signals are used as the external optical signals to lock ONU transmitters of different PONs, one or more wavelengths per PON.

All optical signals generated by the transmitters 501, modulated and non-modulated, are combined by a 2N×1 AWG multiplexer 516, and a resulting WDM signal is provided to the MRN 515 via a circulator 540 and a directional coupler 581; other known in the art wavelength multiplexing technologies for combining 2N wavelength-spaced optical signals can also be used.

The ROADM 520 receives both the modulated and non-modulated optical signals, with the modulated optical signals referred to herein as the wavelength channels, from the MH 515 and re-directs one downstream wavelength channel carrying information destined to ONUs 550 and one non-modulated optical signal at a selected wavelength towards the remote node 145. In this embodiment of the invention the ROADM 520 is cyclic, meaning that it directs wavelength $\lambda_i$ and $\lambda_{i+N}$ for i=1, ..., N along the same route; it includes three cyclic 1×N AWG multiplexers 505-507, also functioning as N×1 de-multiplexers, and N 1×2 switches 511. Each cyclic AWG multiplexer 505-507 has an FSR (free spectral range) substantially equal to a spectral width of the first wavelength band, such that light at wavelengths $\lambda_i$ and $\lambda_{N+i}$, i=1, ..., N, will output at the same AWG output port and be routed by the corresponding switch 511 to the same port, for example to the drop port which connects to a remote node 140 of the PON 506 as shown in FIG. 10. By way of example, the AWG filters 505-507 have a 1600 GHz FSR, so that the network 500 supports up to N=16 downstream wavelength channels $\lambda_1$ to $\lambda_N$, and the same number of upstream channels $\lambda_{N+1}$ to $\lambda_{2N}$.

By using an 1×k switch in place of the 1×2 switch 511 and additional cyclic AWG filters as required, the ROADM 520 can have k bidirectional drop ports to connect to up to k different PONs, where k can be more than 2.

By way of example, the metro hub 515 allocates a modulated downstream wavelength channel $\lambda_N$ to carry communication signals to the ONUs of the PON 550, and generates a control signal for remotely configuring a respective switch 511 of the ROADM 560 to drop the allocated wavelength; simultaneously, this will also result in droppig a non-modulated optical signal at the wavelength $\lambda_{2N}$ through the same drop port of the ROADM 560, so that both the modulated wavelength channel $\lambda_N$ and the non-modulated optical signal at the wavelength $\lambda_{2N}$ are provided to each of the ONUs 550 through an optical power splitter 140 at a remote node 145.

The ONUs 550 include a CWDM (coarse WDM) filter 145 configured to de-multiplex the first and second wavelength bands, so that any of the wavelengths from $\lambda_1$ to $\lambda_N$ received from the RN 560 is coupled into the ONU receiver 531, and any of the wavelengths from $\lambda_{N+1}$ to $\lambda_{2N}$—to the ONU transmitter 540. Generally, in this embodiment wavelengths of the wavelength channel and the external optical signal received by a same ONU are spaced by the FSR, that is they differ from each other by a value corresponding to the FSR of the ROADM interfacing the respective PON. In the exemplary scenario considered herein, the ONU receiver receives the modulated downstream wavelength channel $\lambda_N$, while the ONU transmitter 540 receives the non-modulated optical signal at the wavelength $\lambda_{2N}$, which locks the ONU transmitter 540 for upstream signal transmission at said wavelength. The upstream optical signal at the wavelength $\lambda_{2N}$ generated by the ONU transmitter 540 propagates along the same route in the PON 550 as the downstream signals, where it is combined by the splitter 140 with upstream optical signals of the same wavelength $\lambda_{2N}$ from other ONUs of the PON 550 to form an upstream wavelength channel $\lambda_{2N}$, which is coupled by the ROADM 520 back into the MRN 510 when it is eventually received and processed by a receiver 530 at the metro hub 515.

In other embodiments, the external optical signals defining the operation wavelength of the ONU transmitters can be generated using a single multi-wavelength optical source instead of the second set of N DFB lasers described hereinabove with reference to FIG. 10. This multi-wavelength optical source, or an optical comb generator, can take the form of an erbium doped fiber amplifier (EDFA) followed by a WDM filter for spectral slicing of the EDFA-generated spontaneous optical emission, or a multi-wavelength comb-generating laser emitting simultaneously on all N wavelengths $\lambda_N$...$\lambda_{2N}$ such as lasers described in an article "Multifrequency lasers and applications in WDM networks," by M. Zirngibl, published in: IEEE Comm. Mag., 36(12), 39-41 (1998), which is incorporated herein by reference.

Light from such a multi-wavelength source can be combined with the information-carrying downstream wavelength channels generated by the first set of N DFB lasers 501 using a CWDM multiplexing filter similar to the CWDM filter 520 used at the ONUs 550.

The embodiments described hereinabove use a single metro hub to generate all downstream optical signals and receive all upstream optical signals in the unified metro-access network of the present invention, to perform ONU transmitter synchronization for time-domain multiplexing, and to provide all optical signals for remotely setting the wavelength of the ONU transmitters. However, it may be preferable in some cases to have more than one metro hub in a metro ring network, for example if communication services that the network provides to the end users originate from different service providers and/or different geographical locations in the metro area.

Figure 11:
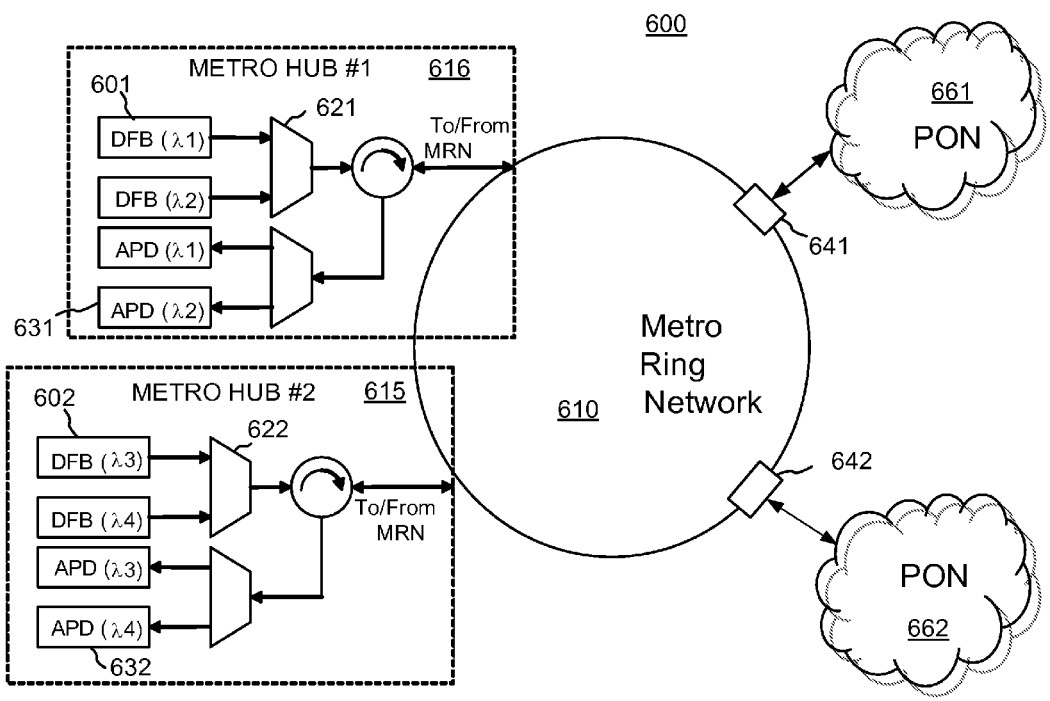
FIG. 11 is a schematic diagram of the wavelength-reconfigurable optical network utilizing two metro hubs providing different services to a plurality of PONs.

FIG. 11 schematically illustrates an optical network 600 according to another aspect of the present invention, wherein a plurality of PONs connected to a single metro network share services of several metro hubs at different locations within the metro network. In the shown exemplary embodiment, the network 600 includes two metro hubs 616 and 615, each of which connects to an MRN 610 at a different location and services several PONs, of which two PONs 661 and 662 are schematically shown as clouds. The PONs 661 and 662 connect to the MRN 610 using two ROADMs 641 and 642, respectively, and include each a plurality of ONUs which may be connected through a remote node, which are not shown, as described hereinbefore with reference to FIG. 5. By way of example, the metro hub 616 provides a first set of services, such as HDTV, to the end user ONUs at the PONs 661 and 662 using transmitters 601 for generating downstream signals at a first group of ITU wavelengths, e.g. $\lambda_1$ and $\lambda_2$, while he metro hub 615 provides a second set of services, such as VOIP and data, to the end user ONUs at the PONs 661 and 662 using transmitters 602 for generating downstream signals at a second group of ITU wavelengths, e.g. $\lambda_3$ and $\lambda_4$. The ROADM 661 can be configured to drop wavelengths $\lambda_1$ and $\lambda_3$ and direct them to the ONUs of PON 661, while the ROADM 661 can be configured to drop wavelengths $\lambda_2$ and $\lambda_4$ and direct them to the ONUs of PON 662.

The use of a ROADM to provide a seamless wavelength-reconfigurable optical interface between the metro and access portions of an optical network is one of important advantageous features of the present invention. According to the invention, the ROADM can have a single drop port for interfacing a single PON, or multiple drop ports for interfacing multiple PONs. In some embodiments, for example when individual ONUs require the full bandwidth of a wavelength channel, one or more drop ports of a multi-drop-port ROADM can be used to connect directly to the ONUs via bidirectional fiber-optic access links without an intermediate remote node performing power splitting.

Figure 12:
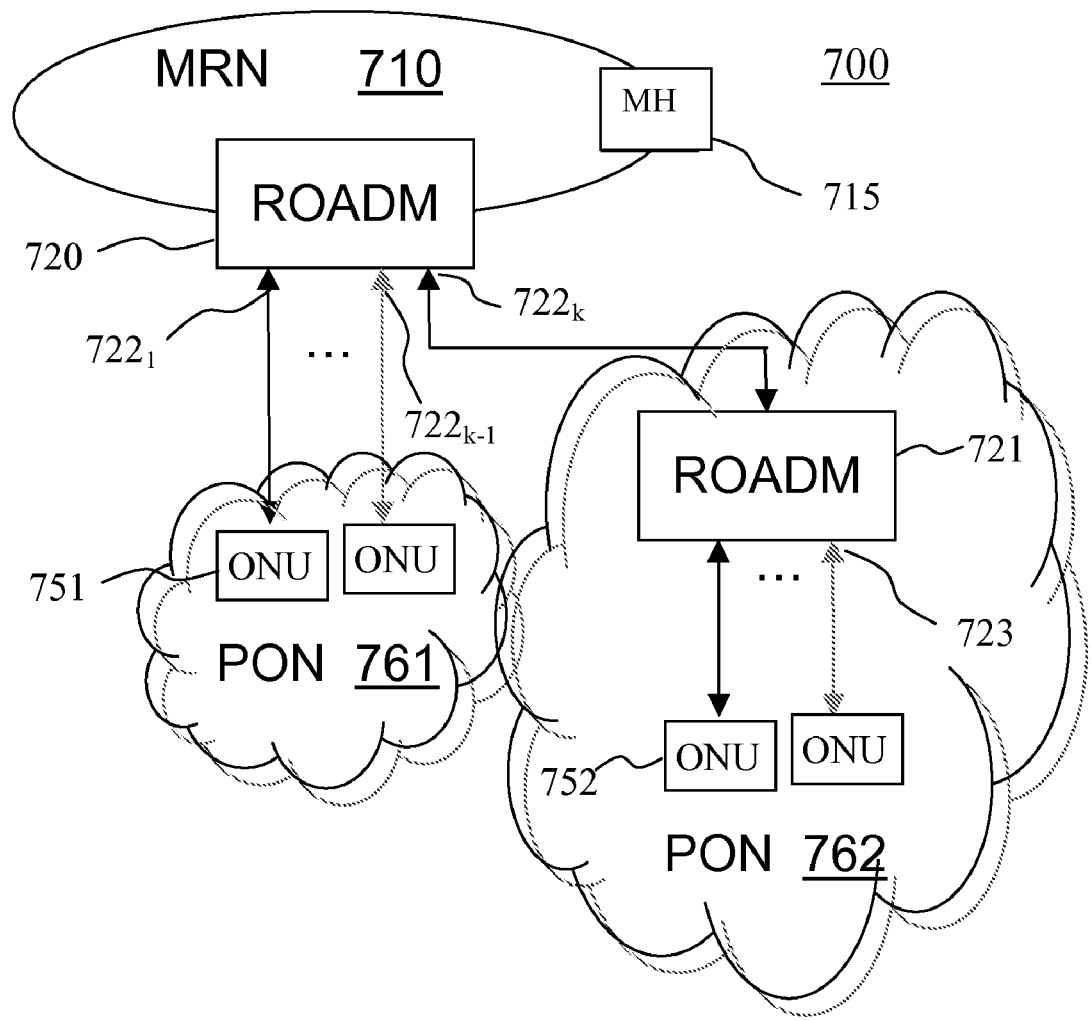
FIG. 12 is a schematic diagram of the wavelength-reconfigurable optical network utilizing a ROADM in a remote node of a PON.

In other embodiments, ROADMs can be cascaded to provide independent wavelength reconfigurability for individual ONUs. An optical network 700 according to one such embodiment is schematically illustrated in FIG. 12. In this network, a first multi-port ROADM 720 having k add/drop ports, where k≧3, and located at a node of an MRN 710 interfaces two PONs 761 and 762. PON 716 includes a plurality of ONUs 751, each connect to one of (k−1) add/drop ports $722_1$ to $722_{k-1}$ of the ROADM 720, each of these ports configured to drop a selected wavelength channel to a designated ONU 751 connected to it by a dedicated bidirectional fiber-optic access link. One of the add/drop ports of the ROADM 720, namely a port $721_k$, is configured to drop multiple wavelengths channels. It is connected by a bidirectional trunk optical link to a remote node of the second PON 762 that includes a second ROADM 721 with multiple drop ports 723 each of which is connected to a respective ONU 752 by a bidirectional access link. The second ROADM 721 is remotely configurable from the metro hub 715 to direct each of the received multiple wavelength channels towards a designated ONU 752. In this configuration, each of the ONUs 751 and 762 receives a single downstream wavelength channels, which may also serve for setting the wavelength of the ONU transmitter as described hereinabove, and therefore the ONUs 752 do not require a tunable filter. The network configuration shown in FIG. 12 can be advantageous for connecting a large number of ONUs with high bandwidth requirements, or to connect to a metro network a group of users located at a large distance from the MRN, since the insertion loss of a ROADM can be substantially smaller than that of a power splitter.

Although the invention has been described hereinabove with reference to particular embodiments thereof, it should be understood that theses embodiments are examples only and should not be construed as limiting the invention. It should also be understood that each of the preceding embodiments of the present invention may utilize a portion of another embodiment.

Of course numerous other embodiments may be envisioned without departing from the spirit and scope of the invention.

We claim:

1. An optical network for providing communication services to end-users, comprising:
   a metro ring network (MRN) interconnecting a plurality of network nodes; and,
   a first passive optical network (PON) optically connected to the MRN at one of the network nodes, comprising
      a plurality of optical network units (ONU) associated with the end-users and connected to receive one or more wavelength channels from the MRN through a plurality of optical access links;
   wherein the MRN comprises:
      a metro hub for aggregating communication signals onto a plurality of wavelength channels and for transmitting said wavelength channels over the MRN, and
      a first optical add-drop module (OADM) disposed at the one of the network nodes and interfacing the first PON for selectively dropping at least one of the wavelength channels for providing thereof to one or more of the plurality of ONUs,
      wherein the first OADM is remotely configurable to selectively direct any of the plurality of the wavelength channels to the first PON so as to provide wavelength re-configurability in the optical network.

2. An optical network according to claim 1 wherein the first PON comprises a remote node for directing the one or more wavelength channels received from the MRN to the ONUs through the plurality of optical access links.

3. An optical network according to claim 2 wherein the first OADM comprises a first drop port, and wherein the remote node comprises a passive optical splitter having a trunk port connected to the remote node of the first PON by a trunk optical link, and a plurality of access ports connected to the ONUs by the access optical links for broadcasting the one or more wavelength channels to each of the plurality of ONUs.

4. An optical network according to claim 2 wherein:
   the first OADM comprises a plurality of drop ports wherein one of the plurality of drop ports is configured for dropping a plurality of wavelength channels, and
   the remote node comprises a second remotely reconfigurable OADM optically connected to said one of the plurality of drop ports by a trunk optical link for selectively directing the plurality of wavelength channels to the plurality of ONUs via a plurality of access optical links, so that each of the ONUs receives a single one of the plurality of wavelength channels.

5. An optical network according to claim 1 wherein each of the ONUs comprise an ONU receiver for receiving the at least one of the wavelength channels and an ONU transmitter for transmitting an upstream optical signal to the metro hub.

6. An optical network according to claim 5 wherein the ONU transmitter is remotely configurable for transmitting the upstream optical signal at any one of a plurality of spaced wavelengths.

7. An optical network according to claim 6, wherein the ONU transmitter is remotely configurable for transmitting at a wavelength that is defined by a wavelength of an external optical signal, and wherein the metro hub includes an optical source for generating the external optical signal for remotely setting the wavelength of the ONU transmitters of the first PON.

8. An optical network according to claim 7, wherein the ONU transmitter comprises one of a reflective optical amplifier, an edge-emitting Fabry-Perot laser diode configured for wavelength locking by the external optical signal from the metro hub, and a vertical cavity semiconductor laser configured for wavelength locking by the external optical signal from the metro hub.

9. An optical network according to claim 7, wherein the at least one of the ONUs includes a power splitter for directing a portion of the at least one of the optical channels received by the ONU to the ONU transmitter for setting the wavelength thereof, and for directing another portion of the at least one of the optical channels to the ONU receiver for detecting a communication signal.

10. An optical network according to claim 7, wherein the optical source is for generating external optical signals at a plurality of wavelengths for remotely setting optical wavelengths of a plurality of ONU transmitters.

11. An optical network according to claim 10, wherein the optical source comprises one of a plurality of single-wavelength laser diodes, a multi-wavelength laser, and an optically-pumped fiber amplifier followed by a wavelength slicing de-multiplexer.

12. An optical network according to claim 7, wherein the metro hub comprises a plurality of optical transmitters for generating the wavelength channels carrying communication signals, and a wavelength multiplexer for multiplexing the wavelength channels.

13. An optical network according to claim 12, wherein the metro hub comprises TDM means for time domain multiplexing of communication signals onto at least some of the wavelengths channels.

14. An optical network according to claim 13, wherein the remote node comprises an optical combiner for combining return optical signals from the ONUs to form an upstream wavelength channel, and wherein the ONU optical transmitters are for transmitting the upstream optical signals in non-overlapping time slots for time-domain multiplexing thereof.

15. An optical network according to claim 14, wherein the metro hub includes control means for synchronizing the ONU optical transmitters for facilitating the time domain multiplexing of the upstream optical signals.

16. An optical network according to claim 15 further comprising a second PON, the second PON including a second remote node optically coupled to a second plurality of ONUs each including an optical receiver and an optical transmitter, wherein the first OADM comprises a second drop port optically connected to the second PON via a second trunk optical link, and is remotely configurable for directing at least another one of the optical channels from the MRN to the second PON for broadcasting thereof to the second plurality of ONUs.

17. An optical network according to claim 16, wherein the metro hub is for synchronizing the transmission of upstream optical signals by the ONU transmitters of the first and second PONs, and for providing external optical signals for selectively setting transmission wavelengths of the ONU transmitters of the first and second PONs.

18. An optical network according to claim 7 wherein the first OADM is characterized by an FSR, and wherein for each of the ONUs the wavelengths of the upstream optical signal and the received wavelength channel are spaced by the FSR of the first OADM.

19. An optical network according to claim 7, further comprising a second PON having a plurality of ONUs each of which comprises an ONU transmitter remotely configurable for transmitting an upstream optical signal at any one of a plurality of spaced wavelengths as defined by an external optical signal, and
wherein the optical source at the metro hub is for generating external optical signals for remotely setting the wavelengths of the ONU transmitters of the first and second PONs.

20. An optical network according to claim 1 wherein the first OADM is remotely configurable to drop two or more wavelength channels for providing thereof to the plurality of ONUs of the first PON, and wherein each of the ONUs includes a tunable optical filter for selectively providing a single one of the two or more wavelength channels to the ONU optical receiver.

21. An optical network according to claim 1 wherein the OADM has a plurality of drop ports each connected to one of the ONUs by one of the optical access links for directing thereto a selected wavelength channel thereto.

* * * * *